R. F. DEVINE.
FORGING APPARATUS.
APPLICATION FILED JULY 12, 1912.
1,041,442.
Patented Oct. 15, 1912.
6 SHEETS—SHEET 4.
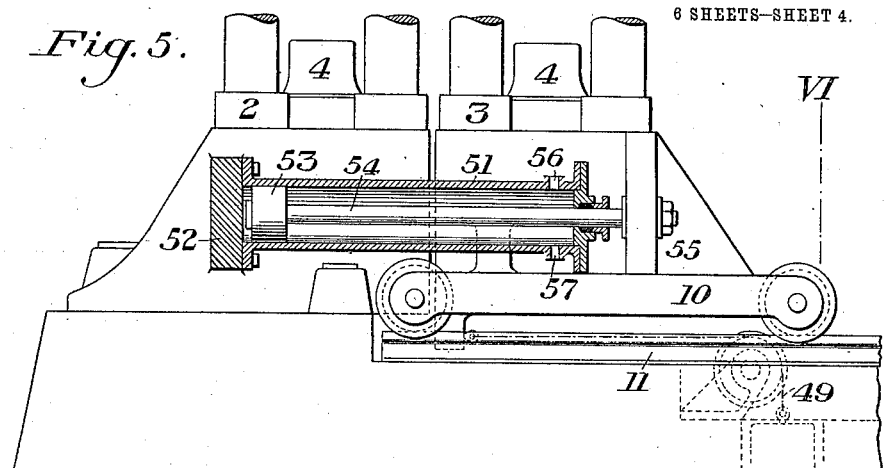
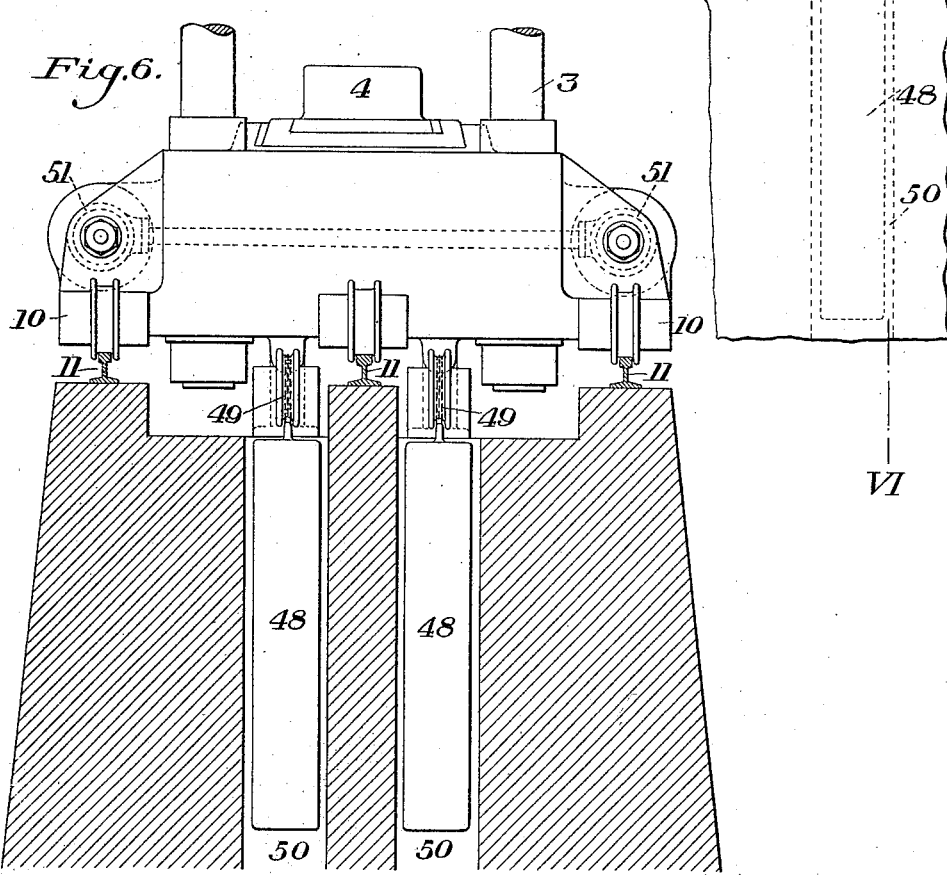

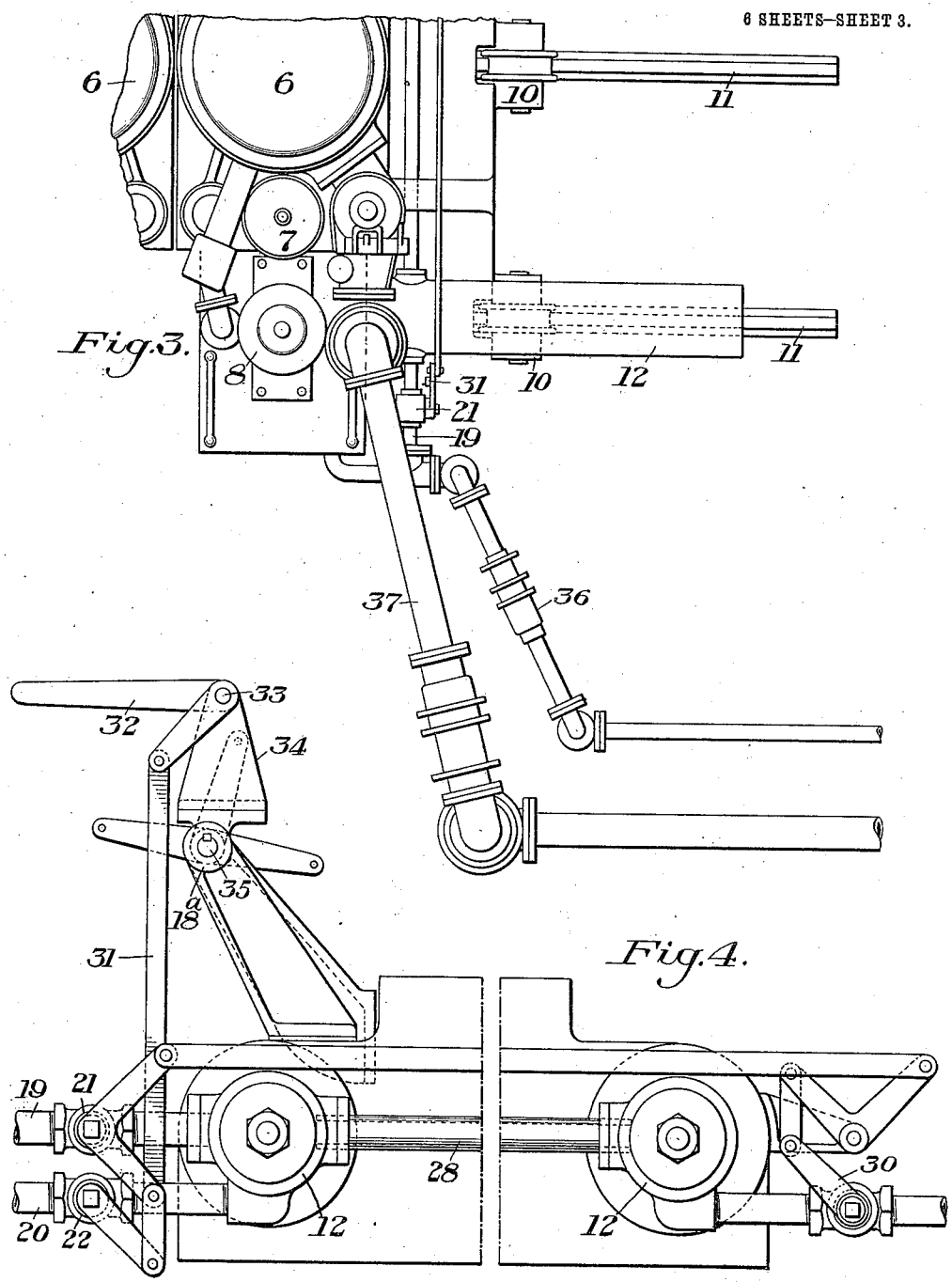

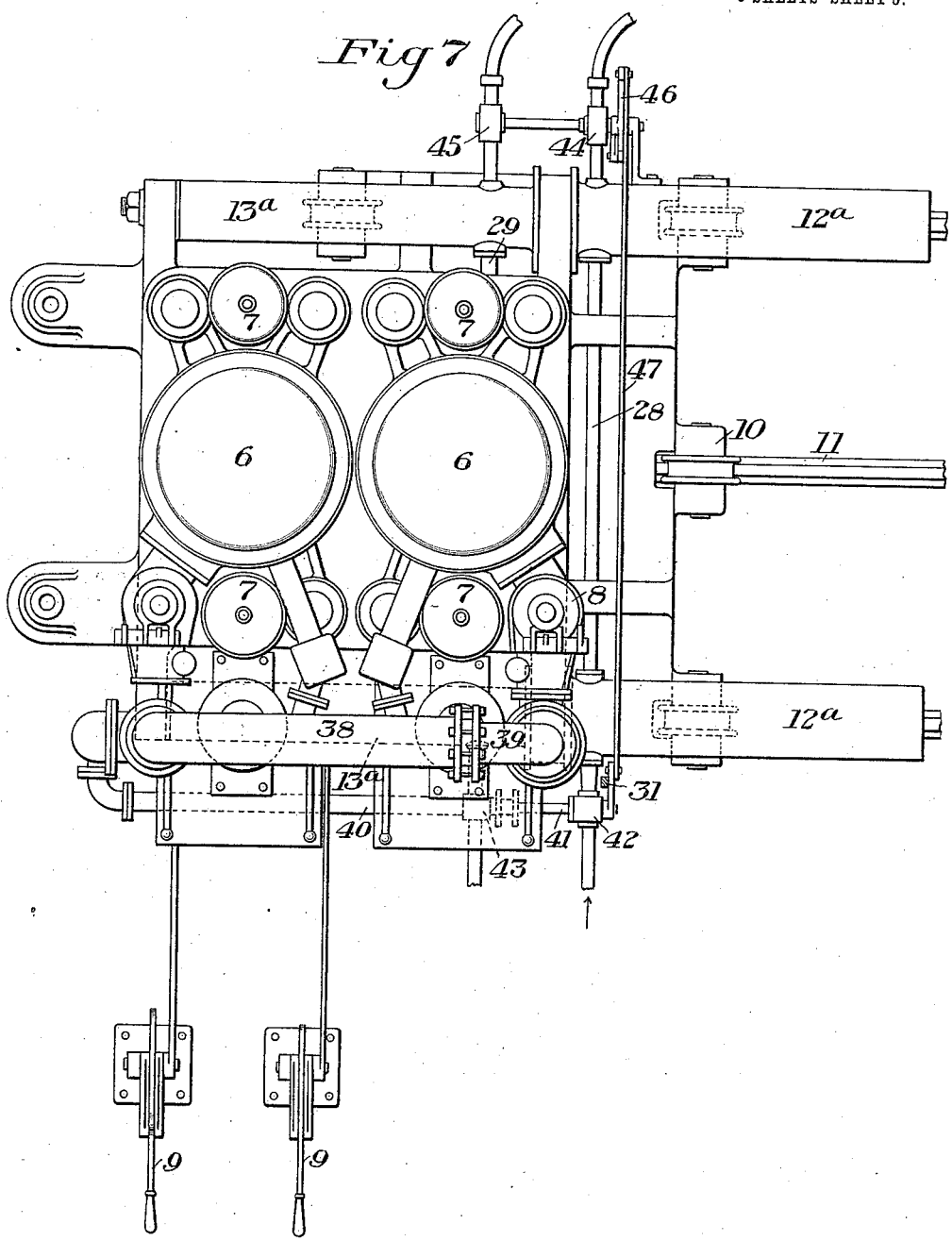

R. F. DEVINE.
FORGING APPARATUS.
APPLICATION FILED JULY 12, 1912.

1,041,442.

Patented Oct. 15, 1912.

6 SHEETS—SHEET 6.

WITNESSES
R A Balderson
G B Bleming

INVENTOR
Robert F. Devine
by Bakewell, Byrnes & Parmelee
his attys

UNITED STATES PATENT OFFICE.

ROBERT F. DEVINE, OF ERIE, PENNSYLVANIA.

FORGING APPARATUS.

1,041,442.   Specification of Letters Patent.   Patented Oct. 15, 1912.

Application filed July 12, 1912. Serial No. 709,036.

*To all whom it may concern:*

Be it known that I, ROBERT F. DEVINE, a resident of Erie, in the county of Erie and State of Pennsylvania, have invented a new and useful Improvement in Forging Apparatus, of which the following is a full, clear, and exact description, reference being had to the accompanying drawings, forming part of this specification, in which—

Figure 1:
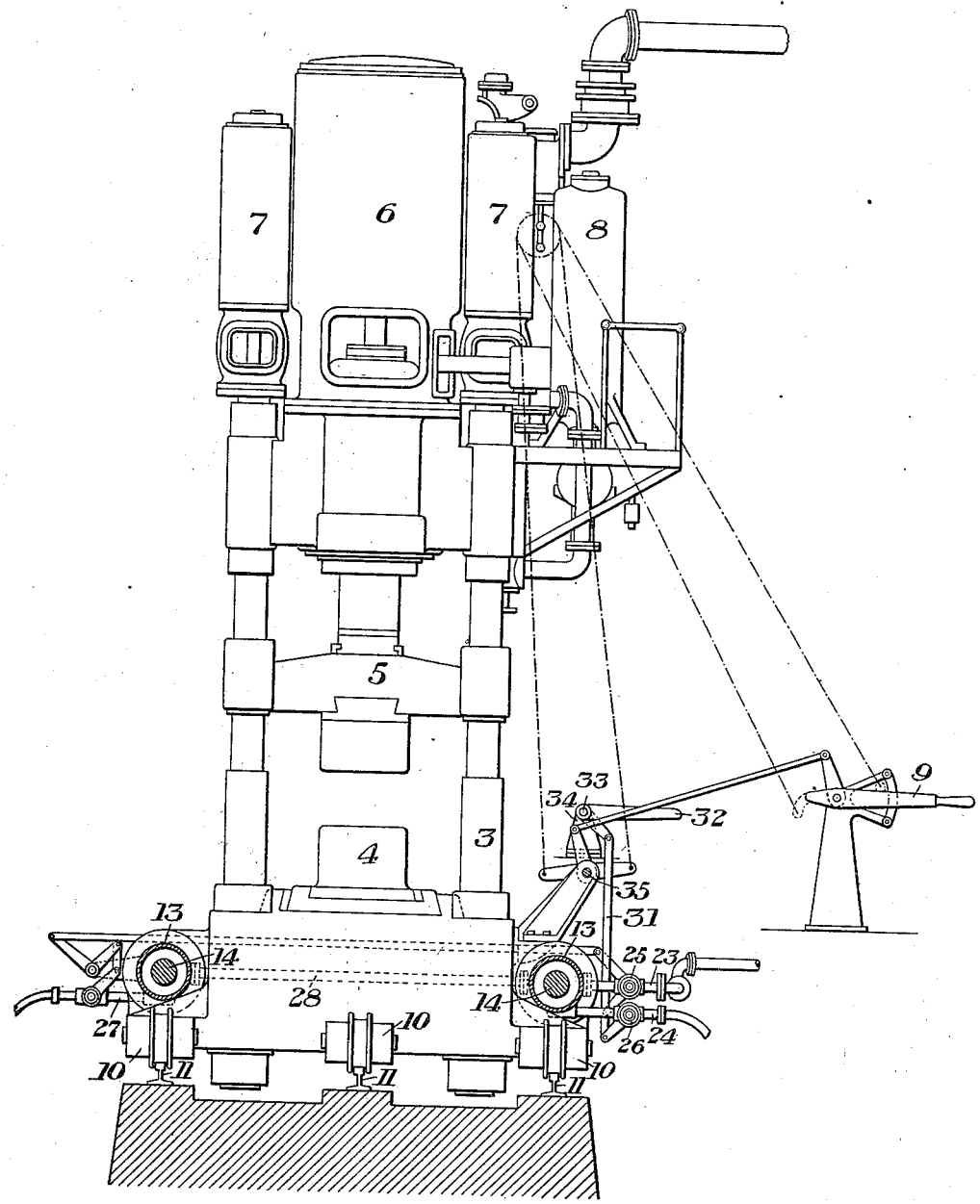
Figure 2:
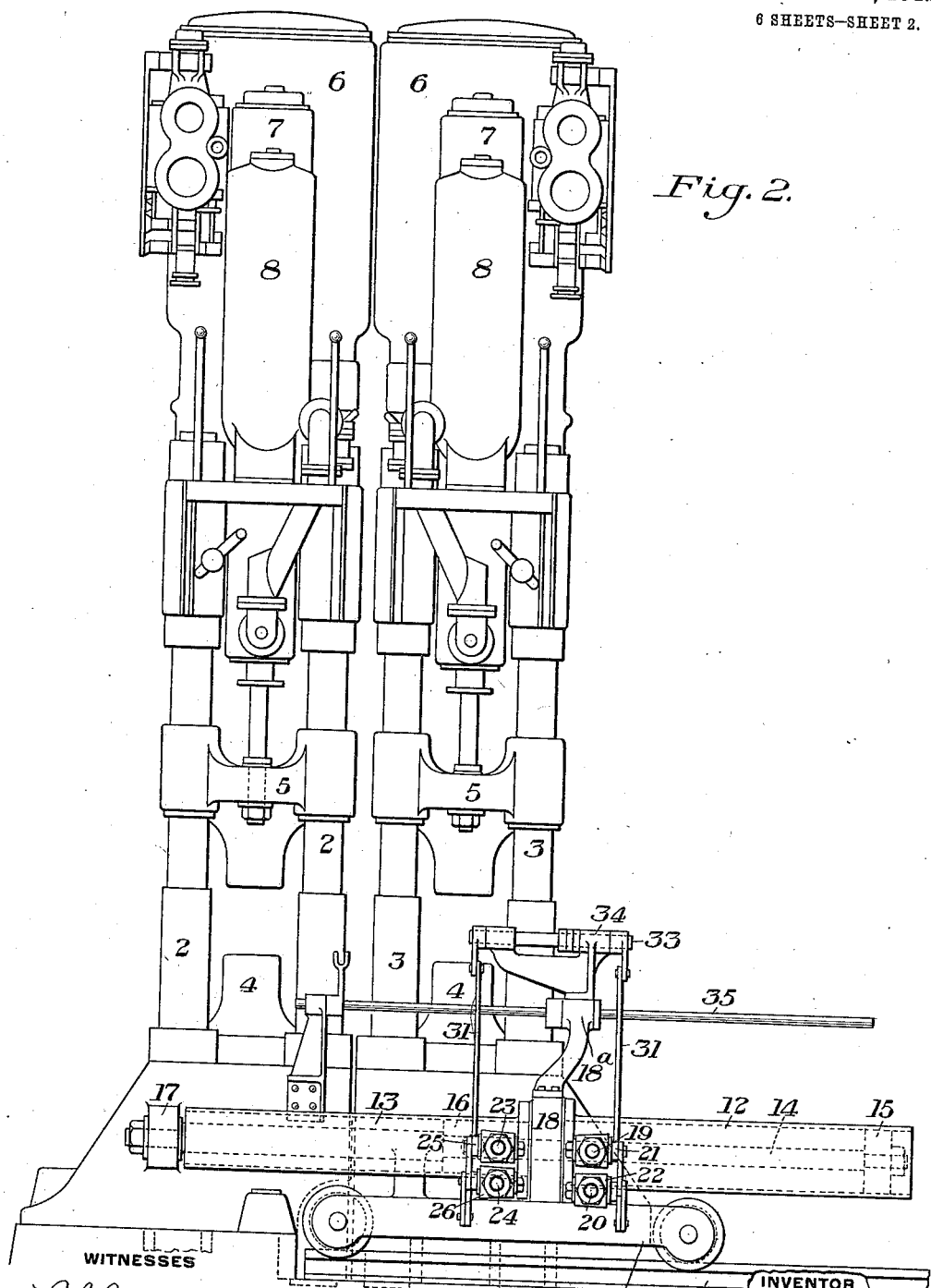
Figure 8:
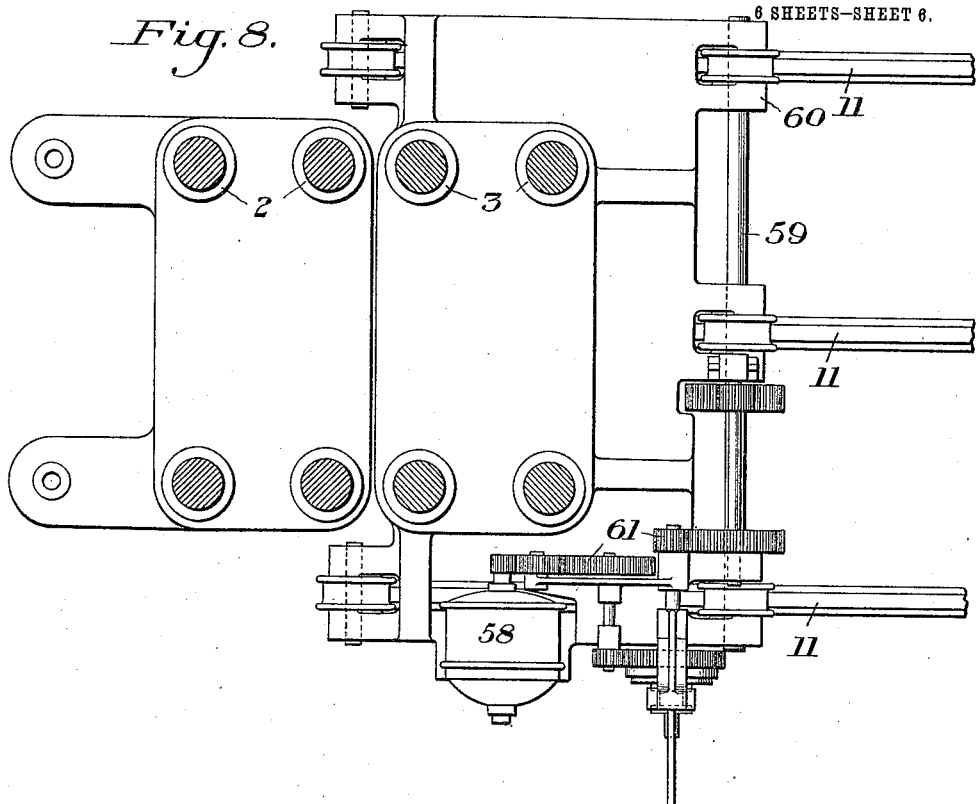
Figure 9:
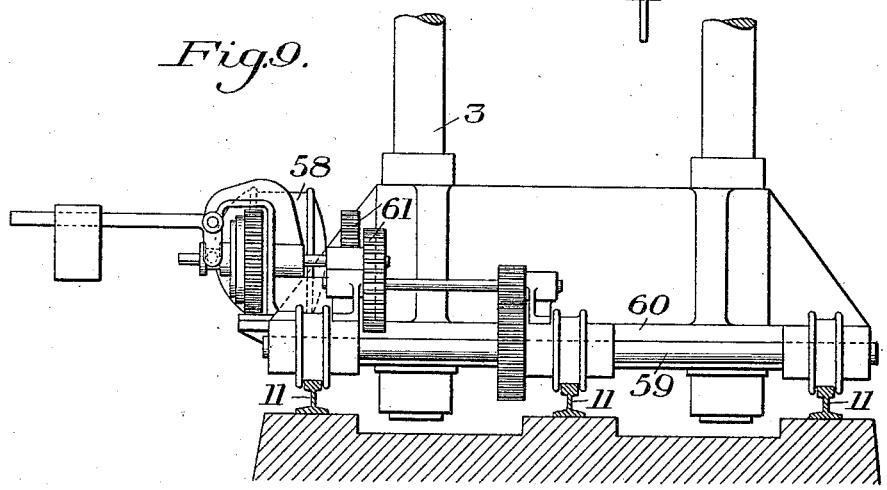

Figure 1 is an end view showing the movable forging press; Fig. 2 is a side view of forging apparatus embodying my invention; Fig. 3 is a plan view of a portion of the apparatus; Fig. 4 is a side view partly broken away and showing a portion of one form of valve-actuating mechanism; Fig. 5 is a view of a portion of a modified form of machine, the view being partly in vertical section and partly in side elevation; Fig. 6 is a section on the line VI—VI of Fig. 5; Fig. 7 is a plan view illustrating another modification; and Figs. 8 and 9 are, respectively, a plan and a front elevation, partially diagrammatic, illustrating another modification.

My invention has relation to forging apparatus, and is designed to provide apparatus whereby two forging presses may be arranged to simultaneously act upon a single piece being forged, thereby enabling large or long forgings to be more rapidly worked and under a higher heat.

To this end, my invention comprises two forging presses of any suitable character, one of which is rigidly affixed to a suitable bed or base and the other of which, located adjacent to the fixed press, is movable bodily toward and away from the fixed press. Means are employed whereby the movable press can be shifted relatively to the fixed press, so as to provide not only for the desired initial separation between the two presses, but also for a proper movement of the movable press to compensate for the elongation of the piece under the forging operations.

In the accompanying drawings, I have illustrated my invention as applied to forging presses of the steam hydraulic type, but I desire it to be understood that my invention is equally applicable to forging presses of other types.

In the drawings, the numeral 2 designates the frame and bed of the stationary press and 3 the frame and bed of the movable press. 4 designates the anvils of the presses; 5 the movable press heads; 6 the intensifier cylinders; 7 the pull-back cylinders; 8 the fluid reservoirs; and 9 the control levers and connections, a separate lever and control connection being provided for each press.

As the particular construction of the press forms no part of my invention, and as presses of this general type are well known in the art, it need not be here described in detail.

The movable press 3 is mounted upon a roller truck 10 arranged to travel on track rails 11. I preferably provide this truck with three sets of wheels and the track with three parallel rails, although the movable press may be mounted in any other suitable manner.

The two presses are arranged side by side with their anvils and press heads in substantial alinement with each other, so that both presses may act simultaneously upon a single piece, the press 3 being arranged to be moved toward and away from the press 2 on the mounting described.

For the purpose of moving the movable press toward and away from the fixed press, any suitable means may be provided. In the form shown in Figs. 1, 2 and 3, I have illustrated power cylinders 12 and 13, for this purpose, one pair of these cylinders being located at each side of the presses and being arranged to reciprocate over the fixed piston rods 14. Each of these rods has a piston head 15, within the cylinder 12, and a smaller piston head 16 within the cylinder 13, the cylinders 12, which are the return cylinders, being preferably of considerably larger diameter than the advance cylinders 13. The piston rods 14 are stationary, being fixed to the base or bed of the fixed press, as indicated at 17. Both pairs of cylinders are mounted to move with the roller truck. The cylinders of each pair have their inner adjacent ends secured to the frame arm 18, through which the piston rod extends. When steam or other motive fluid is admitted to the cylinder 13 between the piston head 16 and the inner end of the cylinder, the cylinders will be moved to the right (looking at Fig. 2), thereby carrying the press 3 away from the press 2. When motive fluid is admitted to the cylinder 12 between the piston head 15 and the inner end of the cylinder, a reverse or return movement of the cylinder and press 3 is effected. The cylinders may be controlled by any suitable valve mechanism. In the arrangement shown in Figs. 1, 2 and 3, the cylinder 12 at one side of the press is provided with a steam admission pipe 19 and with a steam exhaust pipe 20, the pipe 19 having a control valve 21, and the pipe 20 having a control valve 22. The cylinder 13 at this side of the press is provided with a similar steam supply connection 23, exhaust connection 24, and control valves 25 and 26. The cylinders 12 and 13 at the opposite side of the press are each provided with an exhaust connection 27, steam being admitted to these cylinders from the cylinders 12 and 13 through the cross connections 28 and 29 (see Figs. 4 and 7). The valve for the four cylinders may be simultaneously controlled by any suitable connections. In Figs. 1, 2, 3 and 4, I have shown the valves as having a system of connected crank arms 30, operated by links 31, leading to a manual operating lever 32. The shaft 33 of this lever is mounted in suitable bearings 34, which are carried on an upward extension of the frame arm 18, above described. This arm has a bearing portion 18ª, which is arranged to slide on a guide rod 35 (see Fig. 2).

To permit of the above described movement of the press 3 relative to the press 2, it is, of course, necessary to provide the supply connections for the cylinders 12 and 13 with suitable flexible joints, and the supply connection for the intensifier cylinder 6 of the press 3 should also be provided with a flexible joint. This is illustrated in Fig. 3, in which 36 designates a flexible supply connection for the cylinders 12 and 13, and 37 indicates a flexible connection for the intensifier cylinder 6. A modification of this arrangement is shown in Fig. 7, in which the intensifier supply pipe for the intensifier cylinder of the two presses is made in two telescopic sections 38 and 39, and the supply pipe for the actuating cylinders of the movable press 3 is formed in corresponding telescopic sections 40 and 41. The numerals 42 and 43 designate the admission valves for the cylinders 12ª and 13ª at one side of the machine, and 44 and 45 designate the exhaust valves for the cylinders 12ª and 13ª at the opposite side of the machine. The valves 42 and 43 are shown as mounted on a common stem, and the valves 44 and 45 are also shown as mounted on a common stem, each of these stems having a crank arm 46, and the two crank arms being connected by link 47. The two valves of each pair of valves are so set or timed that when one is opened, the other is closed. The respective pairs of cylinders are connected by cross pipes 28 and 29, as before described. It will be understood, however, that I do not limit myself to any particular valve mechanism for controlling the operation of these cylinders.

In the operation of the press, pressure is constantly maintained in the smaller cylinders 13 or 13ª, preferably to an extent sufficiently great to substantially overcome the load and friction on the movable press; while pressure is admitted into the larger cylinders 12 or 12ª only when it is desired to move the press 3 toward the press 2. In this manner, it will be seen that comparatively little pressure will be required to move the press 3 away from the press 2, and that this will be effected by the elongation of the piece being forged under the action of the forging heads.

Instead of employing the cylinder arrangement above described, I may employ an arrangement such as shown in Figs. 5 and 6, in which the trucks of the movable press are provided with the weights 48, which are connected thereto by means of the chains 49 and which work in suitable pits or wells 50. These counterweights exert a constant tendency to pull the press 3 away from the press 2, and are preferably so adjusted that their action will practically overcome the load and friction of the movable press. In this form of my invention, the movable press is moved back from the fixed press by the single-acting cylinders 51, which are fastened to the base of the fixed press at 52, and within which are pistons 53, carried by rods 54, attached to the base of the movable press at 55. 56 and 57 (Fig. 5) designate the supply and exhaust connections for one of these cylinders.

In Figs. 8 and 9, I have shown another modification, in which an electric motor 58 is employed for actuating the movable press. This motor is geared to the axle 59 of the truck 60, which carries the movable press through the train of reduction gearing 61.

The advantages of my invention will be apparent to those skilled in the art, since it provides a multiple press arrangement by means of which a single piece can be simultaneously acted upon by two forging presses, thereby not only making the forging operations much more rapid, but enabling it to be carried out throughout on the same piece at a higher heat of the piece.

As above indicated, my invention is not limited to the use of presses of any particular type, nor is it limited to the particular mechanism herein shown and described for controlling the operation of the movable press relative to the fixed press.

I claim:

1. In forging apparatus, the combination with a fixed forging press, of another forging press adjacent to the fixed press and mounted for movement toward and away from the same, substantially as described.

2. In forging apparatus, the combination with a fixed press, of another forging press adjacent thereto and in line therewith, and a movable mounting for the second press, substantially as described.

3. In forging apparatus, the combination with a fixed forging press, of another press adjacent thereto and mounted for movement toward and away from the fixed press, together with means exerting a normal tendency to separate the two presses, substantially as described.

4. In forging apparatus, the combination with a fixed forging press, of another press adjacent thereto and mounted for movement toward and away from the fixed press, together with means exerting a normal tendency to separate the two presses, and means for moving the movable press toward the fixed press, substantially as described.

In testimony whereof, I have hereunto set my hand.

ROBERT F. DEVINE.

Witnesses:
K. E. BLAIR,
WILLIS F. DURLIN.

---

Copies of this patent may be obtained for five cents each, by addressing the "Commissioner of Patents, Washington, D. C."